United States Patent [19]

Klein

[11] Patent Number: 4,913,460
[45] Date of Patent: Apr. 3, 1990

[54] TWO-WHEELED FOLDABLE GOLF TROLLEY

[75] Inventor: Alfred Klein, Weitersburg, Fed. Rep. of Germany

[73] Assignee: Stabilus GmbH, Koblenz-Neuendorf, Fed. Rep. of Germany

[21] Appl. No.: 297,709

[22] Filed: Jan. 17, 1989

[30] Foreign Application Priority Data

Jan. 25, 1988 [DE] Fed. Rep. of Germany ....... 8800831

[51] Int. Cl.$^4$ .............................................. B62D 3/04
[52] U.S. Cl. .................................... 280/646; 224/274; 248/96; 248/129; 280/DIG. 6; D34/15
[58] Field of Search ............ 248/96, 129, 128, 145.6; 280/DIG. 6, 646; 224/274; D34/15

[56] References Cited

U.S. PATENT DOCUMENTS

| | | | |
|---|---|---|---|
| 2,770,466 | 11/1956 | Pearson et al. | 280/646 |
| 3,400,943 | 9/1968 | Meiklejohn | 280/646 |
| 3,918,735 | 11/1975 | Denzer et al. | 280/DIG. 6 X |
| 4,474,388 | 10/1984 | Wagner | 280/646 |
| 4,681,341 | 7/1987 | Lai | 280/DIG. 6 X |
| 4,714,268 | 12/1987 | Mather et al. | 248/96 X |
| 4,751,755 | 6/1988 | Carey, Jr. et al. | 5/72 |
| 4,759,559 | 7/1988 | Moulton | 280/DIG. 6 X |
| 4,784,401 | 11/1988 | Raguet | 280/DIG. 6 X |
| 4,793,622 | 12/1988 | Sydlow | 280/DIG. 6 X |

FOREIGN PATENT DOCUMENTS 2461851 7/1980 France .

Primary Examiner—Ramon O. Ramirez
Attorney, Agent, or Firm—Brumbaugh, Graves, Donohue & Raymond

[57] ABSTRACT

A two-wheeled foldable golf trolley is foldable and unfoldable so as to define a transportation and storage condition in the folded status and a use condition in the unfolded status. A gas spring is provided between relatively pivotable parts of the trolley for biasing the trolley towards one of said folded and unfolded position.

19 Claims, 4 Drawing Sheets

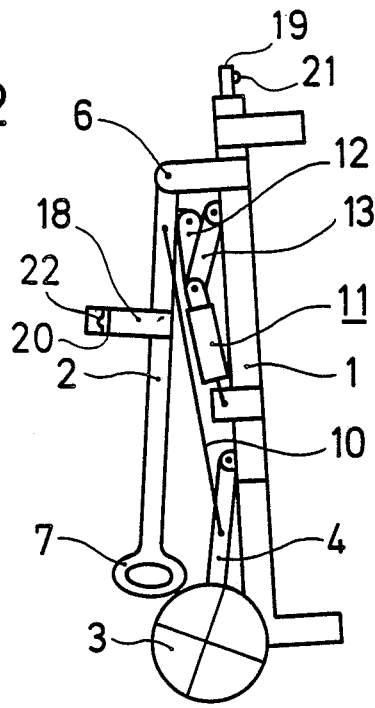
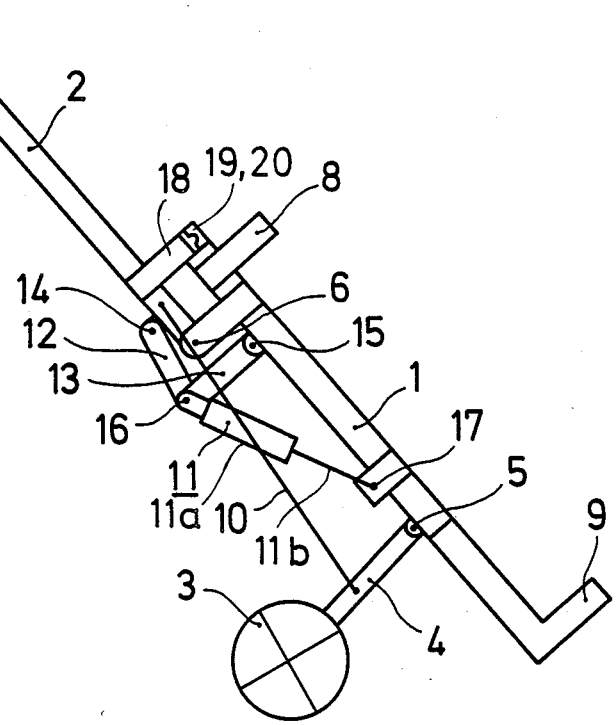

TWO-WHEELED FOLDABLE GOLF TROLLEY

BACKGROUND OF THE INVENTION

Two-wheeled foldable golf trolleys are frequently used by golfers for carrying the golfer's bag which contains the golf irons and other instruments necessary for playing golf. Such golf trolleys must have in use an overall size which allows the golfer to manipulate the trolley on a golf ground. On the other hand, the golf trolley must be small enough to be accommodated within a motor car. Therefore, it is usual to have golf trolleys which can be folded and unfolded.

OBJECT OF THE INVENTION

It is an object of the invention to provide a foldable golf trolley which can be easily folded and unfolded and is stable in use.

SUMMARY OF THE INVENTION

A two-wheeled foldable golf trolley comprises a main structure having a lower end portion and an upper end portion. A pair of coaxial wheels is located adjacent to said lower end portion. A prolongation structure is pivotally mounted on said main structure adjacent to the upper end portion thereof about a substantially horizontal axis. This prolongation structure has a handle adjacent to an end of said prolongation structure, which handle is remote from said pivot axis. The prolongation structure is pivotable between a first position, namely a position of use, in which the prolongation structure extends beyond said upper end portion of said main structure, and a second position, namely a position of storage or transportation, in which said handle is adjacent to said lower end portion of said main structure. A gas spring having a cylinder member and a piston rod member is pivotally connected by one of its members to one of said main structure and said prolongation structure, and is connected by the other of its members to the other one of said main structure and said prolongation structure. This gas spring biases said prolongation structure towards one of said first and said second positions.

According to a preferred embodiment the gas spring biases said prolongation structure towards said first position in substantially all positions between said second position and said first position. This preferred solution has the advantage that after a short unfolding movement by hand the prolongation structure enters automatically into said position of use and is stabilized by the gas spring in said position of use.

While it is easily possible to maintain the golf trolley in the position of transportation and storage by arresting means preventing an unfolding movement, a most simple and preferred solution for maintaining the golf trolley in the position of use and storage is obtained in that the gas spring is connected to said main structure and to said prolongation structure such that in said position of storage and transportation the biasing action of said gas spring onto said prolongation structure is substantially eliminated, preferably completely eliminated.

A most simple kinematical solution is obtained in that said gas spring is connected in a lower pivot point by one of its members to said main structure and is connected in an upper pivot point by the other of its members to the apex of a scissors system. This scissors system comprises a pair of arms. One of said arms is connected adjacent to an end thereof remote from apex to said main structure, and the other one of said arms is connected adjacent to its end remote from said apex to said prolongation structure. These arms are in said second position (position of storage and transportation) of said prolongation structure substantially folded and in substantial alignment with said gas spring and are unfolded in said first position (position of use) of said prolongation structure.

The prolongation structure can be secured against pivotal movement about said pivot axis in at least one of said first and said second positions, e.g. by snap securing means. These snap securing means may be provided between said main structure and said prolongation structure or between said members of said gas spring.

Alternatively, the securing means comprise a slider member slidable along said prolongation structure and being engageable and disengageable with said main structure by sliding movement along said prolongation structure in opposite directions.

According to a further alternative, the securing means are integrated into said gas spring: The piston rod member is provided with a piston member within said cylinder member. This piston member defines two working chambers within the cylinder member. These working chambers are filled with a pressurized gas. Passage means are provided between the working chambers. A blocking valve is provided within these passage means. By closing the blocking valve the prolongation structure can be blocked in each position with respect to the main structure, i.e. in said first position, in said second position and in all intermediate positions which may be utilizable during use or during transportation and storage of the trolley.

In order to further reduce the space requirements of the trolley for storage and transportation, the wheels may be rotatably mounted on at least one wheel carrier arm which is pivotally mounted adjacent to an end thereof remote from the axis of said wheels on said main structure. A connection rod interconnects said wheel carrier arm and said prolongation structure such that in said first position said wheels are spaced from said lower end portion of said main structure and in said second position said wheels are adjacent to said lower portion of said main structure. With other words: The wheels are brought automatically in a position of use when the prolongation structure is brought into a position of use and vice versa.

The golf trolley may further comprise positioning means for a golfer's bag. These positioning means may be provided on the main structure.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to an embodiment shown in the accompanying drawings, in which:

FIG. 1 shows a side view of a golfer's trolley in use;

FIG. 2 shows a side view in the storage position;

FIG. 6 shows an end view according to the arrow VI of FIG. 5.

DESCRIPTION OF THE PREFERRED EMBODIMENTS

Figure 3:
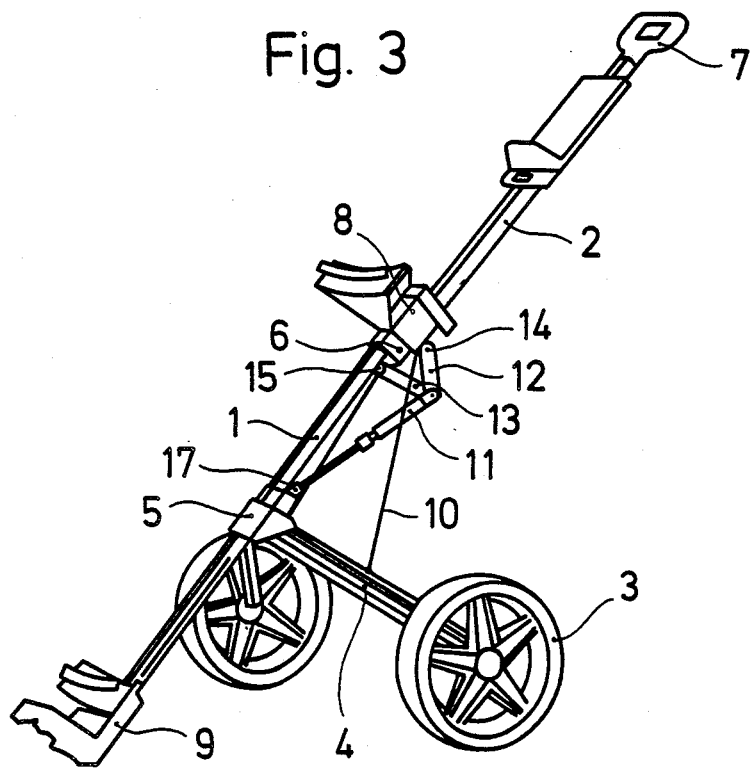
FIG. 3 shows a diagrammatic view of the trolley according to FIGS. 1 and 2.

The golf trolley as shown in the unfolded condition in FIG. 1 consists of a main spar 1, which is connected with a prolongation spar 2 through a swivel joint 6. This prolongation spar 2 carries a handle 7 on its free end and is connected by means of a joint 14 with an arm 12. A further arm 13 is connected in a joint 15 to the main spar 1. The arms 12 and 13 form scissors and are connected in a joint 16 to the cylinder 11a of a gas spring 11. The piston rod 11b of the gas spring 11 is connected in a joint 17 to the main spar 1.

The wheel carrier arms 4 carrying the wheels 3 are likewise foldably arranged about a swivel joint 5 secured to the main spar 1. For the connection of the wheel carrier arms 4 with the prolongation spar 2 a rod 10 is provided which is pivotably connected to both the prolongation spar 2 and to the wheel carrier arms 4. An upper support 8 and a lower support 9 serve for the reception of the golf bag. For the stabilization of the foldable prolongation spar 2 in relation to the main spar 1 a sliding member 18 is arranged on the prolongation spar 2 and in the unfolded position engages with a pin 19 provided at the upper end of the main spar 1. This pin 19 engages a bore 20 of the sliding member 18, when the trolley is in the condition according to FIG. 2. The pin 19 is provided with a detent piece 21 engageable into a detent recess 2 of the bore 20.

To fold up the golf trolley firstly the sliding member 18 is shifted upwards and then, by action of force upon the prolongation spar 2, the latter is pivoted downwards to the main spar 1 about the swivel joint 6. By means of the arms 12 and 13 which form scissors, the piston rod 11b of the gas spring 11 is pushed inwards of the cylinder 11a against the action of the gas pressure. At the same time a pivoting of the wheel carrier arms 4 is achieved by the pivoting movement of the prolongation spar 2 to the main spar 1 through the rod 10. Thus the folded-up position of the golf trolley as represented in FIG. 2 is achieved.

An example of embodiment of the golf trolley is represented in FIG. 3, where the individual parts are provided with the reference numerals corresponding to FIGS. 1 and 2.

It is to be noted that in FIG. 2 the gas spring 11 acts onto the scissors 12, 13 in such a way that no or no substantial torque is exerted onto the prolongation spar 2 in the clockwise direction about the swivel joint 6. Therefore, it is not necessary to provide securing means for maintaining the prolongation spar 2 in the position shown in FIG. 2. Only after unfolding by hand the prolongation spar 2 and the main spar 1 through a small circular path, the gas spring 11 automatically moves the prolongation spar 2 into the position of FIG. 1.

Figure 4:
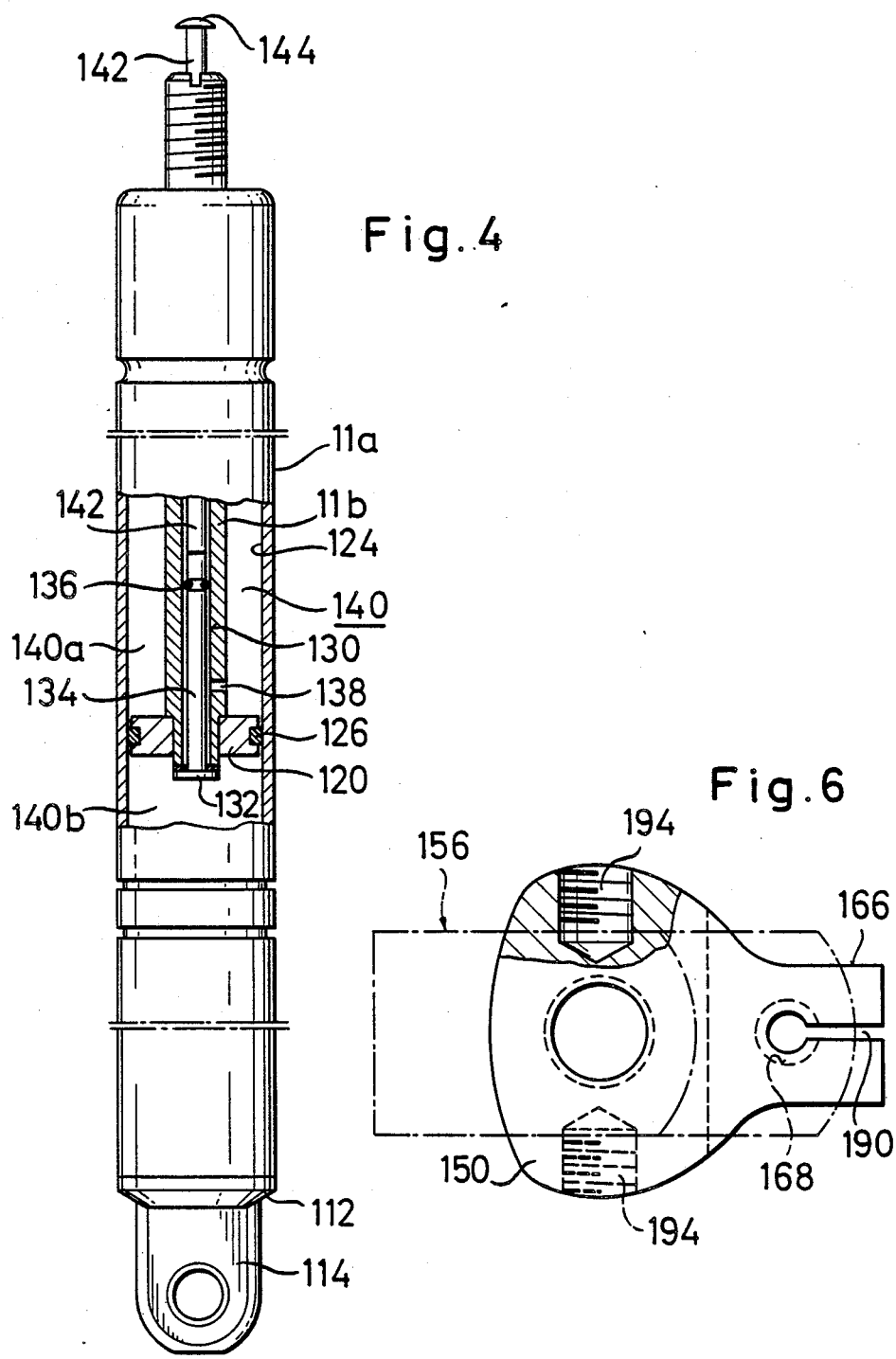
FIG. 4 shows a longitudinal section of a gas spring to be used as a part of the trolley.
Figure 5:
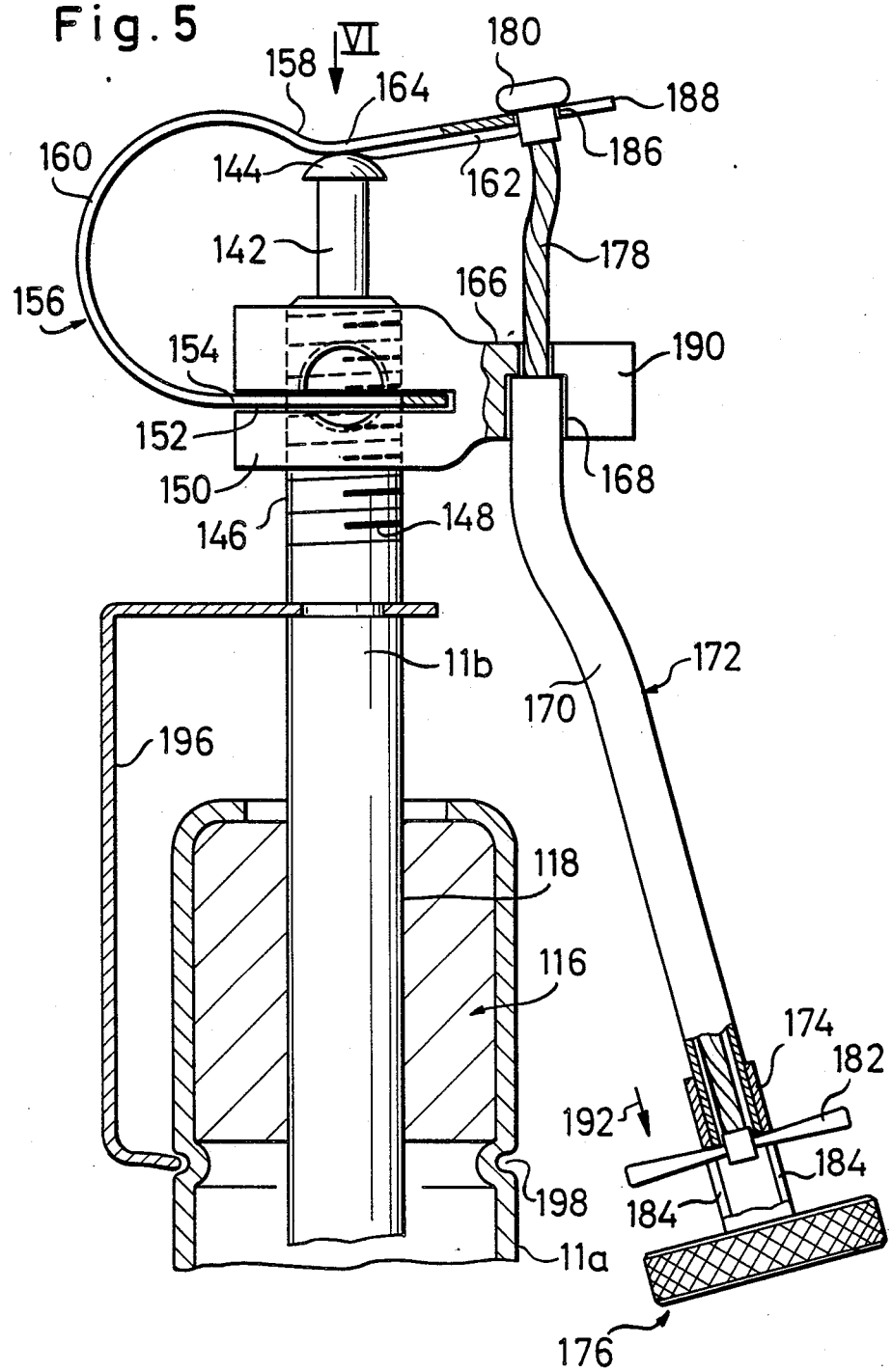
FIG. 5 shows an actuation device of the gas spring according to FIG. 4.

The gas spring 11 may be of the type as shown in FIGS. 4, 5 and 6.

In FIG. 4 a cylinder member is designated by 11a. One end wall is designated by 112. A fastening eye 114 is fixed to the end wall 112. The other end wall 116 (FIG. 5) of the cylinder member 11a is in more detail shown in FIG. 5. This end wall is defined by a guiding and sealing unit comprising a central aperture 118. A piston unit 120 is provided within a cavity 140 defined by the cylinder member 11a. This piston unit 120 is in sealing engagement with the internal circumferential face 124 of the cylinder member 11a by an annular sealing member 126. A piston rod member 11b is fastened to the piston unit 120. This piston rod member 11b passes as can be seen form FIG. 5 through the central aperture 118. The piston rod member 11b is provided with a central bore 130 extending over the total length of the piston rod member 11b. This central bore 130 is closed at its lower end by a valve member 132 integral with a valve shaft 134. The valve shaft 134 is provided with an annular sealing member 136 engaging the inner circumferential wall of the axial bore 130. A radial bore 138 is provided in the piston rod member 11b below the annular sealing member 136.

The cavity 140 is filled with pressurized gas. This cavity 140 is separated by the piston unit 120 into two working chambers 140a and 140b. The pressurized gas acts on the valve member 132, so as to maintain the valve member 132 in sealing contact with the lower end of the piston rod member 11b. A push rod 142 is contained within the central bore 130 of the piston rod member 11b having a mushroom-shaped outer part 144. As long as the valve member 132 is in sealing engagement with the lower end of the piston rod member 11b, the working chambers 140a and 140b are separated from each other and the piston unit 120 is substantially fixed with respect to the cylinder member 11a by the gas pressure on both sides of the piston unit 120. When the push rod 142 is pushed downwards, as seen in FIGS. 4 and 5, the valve member 132 is lifted from the lower end of the piston rod member 11b, so that the flow passage defined by the radial bore 138 and the axial bore 130 is opened. In this condition pressurized gas acting on the cross-section area of the piston rod member 11b pushes the piston rod member 11b upwards, as seen in FIG. 5. By an external force acting onto the upper end of the piston rod member 11b, the piston rod member 11b can be moved downwards against the force resulting from the pressurized gas acting on the cross-sectional area of the piston rod member 11b.

As seen in FIG. 5 the upper end of the piston rod member 11b is provided with a mounting pin 146 having an external thread 148. A mounting bracket 150 is threaded on the mounting pin 146. The mounting bracket 150 is provided with a slot 152. This slot 152 receives a leg 154 of a U-shaped arc 156. The other leg 158 of the U-shaped arc can be regarded as a lever, which is pivotally mounted by a leaf spring 160, which is defined by a middle portion of the U-shaped arc. The lever 158 is reinforced by a reinforcing rip 162, shaped as a longitudinal depression of the arc material. An intermediate portion 164 of the lever 158 is in engagement with the mushroom-shaped outer part 144 of the pushing rod 142.

The mounting bracket 150 is integral with a supporting bracket 166. A bore 168 of the supporting bracket 166 receives the upper end of a flexible conduit 170 of Bowden cable 172. The lower end of the flexible conduit 170 is connected to a base element 174 of an actuating unit 176. The upper end of the core 178 of the Bowden cable 172 is connected by a nipple 180 to the free end of the lever 158. The lower end of the core 178 is connected to a gripping element 182, which is movable in slots 184 of the base element 174. The nipple 180 is introduced into a hole 186 of the lever 158 through a slot 188. The Bowden cable 182 is introduced into the supporting bracket 166 through a slot 190. The leg 154 of the arc 156 is provided with a hole within the slot 152; the mounting pin 146 extends through this hole. In operation the gripping element 182 can be moved along arrow 192 with respect to the base element 174, thereby approaching the lever 158 to the supporting bracket 166. Thereby the pushing rod 142 is moved downwards, as seen in FIG. 5, and the valve member 132 is lifted from the lower end of the piston rod member 11b.

As can be seen from FIG. 6 the mounting bracket 150 is provided with bores 194 for fastening the piston rod member 11b to the swivel joint 17, whereas the fastening eye 114 is connected at 116 to the arms 12, 13.

It is readily understandable that the actuating unit 176 can be easily located at the most appropriate location of the trolley such that the operator can simultaneously actuate the actuating unit and move the spars 1 and 2 with respect to each other.

In FIG. 5 there is shown a snap securing member 196 which engages a recess 198 of the cylinder member 11a. This securing member may be used with or without the pneumatic locking system, as shown in FIGS. 4 to 6. A second recess (not shown) may be provided adjacent to the other end of the cylinder member 11a.

The gas spring as illustrated in FIGS. 4 to 6 is known from French Patent No. 80,15,991 - Publication No. 2,461,851.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A two-wheeled foldable golf trolley comprising:
   a main structure (1) having a lower end portion and an upper end portion,
   a pair of coaxial wheels (3) located adjacent to said lower end portion,
   a prolongation structure (2) pivotally mounted on said main structure (1) adjacent to the upper end portion thereof about a substantially horizontal pivot axis (6),
   said prolongation structure (2) having a handle (7) adjacent to an end of said prolongation structure (2) which is remote from said pivot axis (6),
   said prolongation structure (2) being pivotable between a first position (FIG. 1), namely a position of use, in which said prolongation structure (2) extends beyond said upper end portion of said main structure (1), and a second position (FIG. 2), namely a position of storage or transportation, in which said handle (7) is adjacent to said lower end portion of said main structure (1),
   a gas spring (11) having a cylinder member (11a) and a piston rod member (11b) being pivotally connected by one (11b) of its members (11a, 11b) to one (1) of said main structure (1) and said prolongation structure (2), and being connected by the other (11a) of its members (11a, 11b) to the other one (2) of said main structure (1) and said prolongation structure (2), said gas spring (11) exerting a torque onto said prolongation structure (2) about said pivot axis (6) such as to bias said prolongation structure (2) towards one (FIG. 1) of said first and second positions (FIGS. 1 and 2).

2. A two-wheeled foldable golf trolley as set forth in claim 1, said gas spring (11) biasing said prolongation structure (2) towards said first position (FIG. 1) in substantially all positions between said second position (FIG. 2) and said first position (FIG. 1).

3. A two-wheeled foldable golf trolley as set forth in claim 2, said gas spring (11) being connected to said main structure (1) and to said prolongation structure (2) such that in said second position (FIG. 2) the torque action of said gas spring (11) onto said prolongation structure (2) is substantially eliminated.

4. A two-wheeled foldable golf trolley as set forth in claim 1, further comprising positioning means (8, 9) for a golfer's bag.

5. A two-wheeled foldable golf trolley as set forth in claim 1, said prolongation structure (2) being secured against pivotal movement about said pivot axis (6) by securing means in at least one of said first and said second positions.

6. A two-wheeled foldable golf trolley as set forth in claim 5, said prolongation structure (2) being secured in one (FIG. 1) of said first and said second positions (FIG. 1, FIG. 2) by snap securing means (19, 20, 21, 22).

7. A two-wheeled foldable golf trolley as set forth in claim 6, said snap securing means (10, 20, 21, 22) being provided between said main structure (1) and said prolongation structure (2).

8. A two-wheeled foldable golf trolley as set forth in claim 6, said snap securing means (196, 198) being provided between said members (11a, 11b) of said gas spring (11).

9. A two-wheeled foldable golf trolley as set forth in claim 5, said securing means comprising a slider member (8) slidable along said prolongation structure (2) and being engageable and disengageable with said main structure (1) by sliding movement along said prolongation structure (2) in opposite directions.

10. A two-wheeled foldable golf trolley as set forth in claim 5, said securing means being integrated into said gas spring (11) in that said piston rod member (11b) is provided with a piston member (120) within said cylinder member (11a), said piston member (120) defining two working chambers (140a, 140b) within said cylinder member (11a), said working chambers (140a, 140b) being filled with a pressurized gas, gas passage means (138, 130) being provided between said working chambers (140a, 140b), a blocking valve (132) being provided within said passage means (138, 130).

11. A two-wheeled foldable golf trolley as set forth in claim 4, said positioning means (8, 9) being provided on said main structure (1).

12. A two-wheeled foldable golf trolley comprising:
   a main structure (1) having a lower end portion and an upper end portion,
   a pair of coaxial wheel (3) located adjacent to said lower end portion,
   a prolongation structure (2) pivotally mounted on said main structure (1) adjacent to the upper end portion thereof about a substantially horizontal pivot axis (6),
   said prolongation structure (2) having a handle (7) adjacent to an end of said prolongation structure (2) which is remote from said pivot axis (6),
   said prolongation structure (2) being pivotable between a first position (FIG. 1), namely a position of use, in which said prolongation structure (2) extends beyond said upper end portion of said main structure (1), and a second position (FIG. 2), namely a position of storage or transportation, in which said handle (7) is adjacent to said lower end portion of said main structure (1), a gas spring (11) being in a lower pivot point (17) connected by one (11b) of its members (11a, 11b) to the main structure (1) and being connected in an upper pivot point (16) by the other (11a) of its members (11a, 11b) to the apex (16) of a scissors system (12,13) comprising a pair of arms (12,13), one (13) of said arms (12,13) being connected adjacent to an end thereof remote from said apex (16) to said main structure (1), and the other one (12) of said arms (12, 13) being connected adjacent to its end remote from said apex (16) to said prolongation structure (2), said arms (12, 13) being in said second position (FIG. 2) of said prolongation structure (2) substantially folded and in substantial alignment with said gas spring (11) and being unfolded in said first position (FIG. 1) of said prolongation structure (2).

13. A two-wheeled foldable golf trolley as set forth in claim 12, said snap securing means (10, 20, 21, 22) being provided between said main structure (1) and said prolongation structure (2).

14. A two-wheeled foldable golf trolley as set forth in claim 12, said snap securing (196, 198) being provided between said members (11a, 11b) of said gas spring.

15. A two-wheeled foldable golf trolley as set forth in claim 12, said securing means comprising a slider member (8) slidable along said prolongation structure (2) and being engageable and disengageable with said main structure (1) by sliding movement along said prolongation structure (2) in opposite directions.

16. A two-wheeled foldable golf trolley as set forth in claim 12, said securing means being integrated into said gas spring (11) in that said piston rod member (11b) is provided with a piston member (120) within said cylinder member (11a), said piston member (120) defining two working chambers (140a, 140b) within said cylinder member (11a), said working chambers (140a, 140b) being filled with a pressurized gas, gas passage means (138, 130) being provided between said working chambers (140a, 140b), a blocking valve (132) being provided within said passage means (138, 130).

17. A two-wheeled foldable golf trolley comprising:
a main structure (1) having a lower end portion and an upper end portion,
a pair of coaxial wheels (3) located adjacent to said lower end portion,
a prolongation structure (2) pivotally mounted on said main structure (1) adjacent to the upper end portion thereof about a substantially horizontal pivot axis (6),
said prolongation structure (2) having a handle (7) adjacent to an end of said prolongation structure (2) which is remote from said pivot axis(6),
said prolongation structure (2) being pivotable between a first position (FIG. 1), namely a position of use, in which said prolongation structure (2) extends beyond said upper end portion of said main structure (1), and a second position (FIG. 2), namely a position of storage or transportation, in which said handle (7) is adjacent to said lower end portion of said main structure (1),
a gas spring (11) having a cylinder member (11a) and a piston rod member (11b) being pivotally connected by one (11b) of its members (11a, 11b) to one (1) of said main structure (1) and said prolongation structure (2), and being connected by the other (11a) of its members (11a, 11b) to the other one (2) of said main structure (1) and said prolongation structure (2), said gas spring (11) exerting onto said prolongation structure a torque about said horizontal axis (6), said torque biasing said prolongation structure (2) towards said first position, when said prolongation structure (2), is in a position different than said second position, said biasing action towards said first position being completely eliminated in said second position.

18. A two-wheeled foldable golf trolley comprising:
a main structure (1) having a lower end portion and an upper end portion,
a pair of coaxial wheels (3) located adjacent to said lower end portion,
a prolongation structure (2) pivotally mounted n said main structure (1) adjacent to the upper end portion thereof about a substantially horizontal pivot axis (6),
said prolongation structure (2) having a handle (7) adjacent to an end of said prolongation structure (2) which is remote from said pivot axis (6),
said prolongation structure (2) being pivotable between a first position (FIG. 1), namely a position of use, in which said prolongation structure (2) extends beyond said upper end portion of said main structure (1), and a second position (FIG. 2), namely a position of storage or transportation, in which said handle (7) is adjacent to said lower end portion of said main structure (1),
a gas spring (11) having a cylinder member (11a) and a piston rod member (11b) being pivotally connected by one (11b) of its members (11a, 11b) to one (1) of said main structure (1) and said prolongation structure (2), and being connected by the other (11a) of its members (11a, 11b) to the other one (2) of said main structure (1) and said prolongation structure (2), said gas spring (11) biasing said prolongation structure (2) towards one (FIG. 1) of said first and second positions (FIGS. 1 and 2),
a snap securing means (10, 20, 21, 11) for securing said prolongation structure in one of said first and second positions being integrated into said gas spring (11) in that said piston rod member (11b) is provided with a piston member (120) within said cylinder member (11a), said piston member (120) defining two working chambers (140a, 140b) within said cylinder member (11a) being filled with a pressurized gas, a gas passage wears (138, 130) being provided between said working chambers (140a, 140b), and a blocking valve (132) being provided within said passage means (138, 130).

19. A two wheeled foldable golf trolley as set forth in claims 17 and 18, said wheels (3) being rotatably mounted on at least one wheel carrier arm (4), said wheel carrier arm (4) being pivotally mounted adjacent to an end thereof remote from the axis of said wheels (3) on said main structure (1), a connection rod (10) interconnecting said wheel carrier arm (4) and said prolongation structure (2) such that in said first position (FIG. 1) said wheels (3) are spaced from said lower end portion of said main structure (1) and in said second position (FIG. 2) said wheels (3) are adjacent to said lower portion of said main structure (1).

* * * * *

UNITED STATES PATENT AND TRADEMARK OFFICE
CERTIFICATE OF CORRECTION

PATENT NO. : 4,913,460

DATED : April 3, 1990

INVENTOR(S) : Alfred Klein

It is certified that error appears in the above-identified patent and that said Letters Patent is hereby corrected as shown below:

Col. 4, line 8, "form" should read --from--;
Col. 7, line 29, after "spring" insert --(11)--;
Col. 8, line 19, "n said" should read --on said--;
Col. 8, line 52, "wears" should read --means--;
Col. 8, line 57, after "claims" insert --1, 12,--.

Signed and Sealed this

Thirteenth Day of August, 1991

Attest:

HARRY F. MANBECK, JR.

*Attesting Officer*  *Commissioner of Patents and Trademarks*